United States Patent [19]

Miller et al.

[11] 4,393,507

[45] Jul. 12, 1983

[54] METHOD AND APPARATUS FOR CHARGING LIME INTO AN ELECTRIC ARC FURNACE

[75] Inventors: Ronald E. Miller; James E. O'Hara; Arthur E. Rola, all of Jackson, Mich.

[73] Assignee: Quanex Corporation, South Lyon, Mich.

[21] Appl. No.: 222,500

[22] Filed: Jan. 5, 1981

[51] Int. Cl.³ .............................. F27D 3/10; F27D 3/16
[52] U.S. Cl. ........................................... 373/81; 373/9
[58] Field of Search ................. 13/33; 373/81, 79, 8, 373/9

[56] References Cited

U.S. PATENT DOCUMENTS

| | | | |
|---|---|---|---|
| 2,523,092 | 9/1950 | Bryk et al. | 373/81 X |
| 3,668,871 | 5/1972 | Thom et al. | 13/33 |
| 3,760,960 | 9/1973 | Schumacher et al. | 373/81 X |
| 4,160,869 | 7/1979 | Robertson | 13/33 |

Primary Examiner—Roy N. Envall, Jr.
Attorney, Agent, or Firm—Barnes, Kisselle, Raisch, Choate, Whittemore & Hulbert

[57] ABSTRACT

Particulate lime is discharged from a nozzle into an electric arc furnace through an inlet port in the roof or top of the furnace. The inlet port is laterally displaced from the electrode ports in the center of the top of the furnace. Lime is supplied to the nozzle through a duct pivoted on the furnace to swing the nozzle into alignment with the inlet port for charging lime into the pot and into a retracted position where the nozzle is shielded by the top from heat produced in the furnace. The nozzle has an axial length, axial direction, and cross sectional shape and width constructed and arranged to direct the lime away from the side wall and toward the central portion of the furnace without any significant impingement of the lime directly on the electrodes.

14 Claims, 5 Drawing Figures

METHOD AND APPARATUS FOR CHARGING LIME INTO AN ELECTRIC ARC FURNACE

FIELD OF THE INVENTION

This invention relates generally to an electric arc furnace of the type used in melting metallic materials and, more particularly, to the injection of particulate matter into such a furnace during melting of metallic materials.

BACKGROUND OF THE INVENTION

In making steel, a charge of pig iron, iron ore, and scrap steel can be melted in an electric arc furnace to produce a metal bath. Particulate lime or limestone is injected into the furnace, preferably early in the melting operation, to help form a slag over the surface of the metal bath to permit purification of the bath at a controlled rate. The placement of lime adjacent the electrodes of the furnace also tends to reduce wandering of the arc and decrease the noise level. When a suitable chemical analysis of the metal bath is achieved, deoxidizers such as ferrosilicon are added and the resulting steel is poured into molds and allowed to solidify.

Conventionally, lime is introduced into an electric arc furnace by introducing particulate lime into an airstream which is discharged through a duct in a side wall of the furnace. Since the lime must be introduced in a relatively short period of time, it impinges upon the carbon electrodes with sufficient velocity that it erodes or wears away portions of the electrodes, thereby significantly decreasing their useful life. Since the electrodes are massive and expensive, this erosion is costly and also increases the maintenance and down time of the furnace.

Since the opening of the duct is in the side wall of the furnace, the lime is not deposited uniformly in the center of the upper surface of the charge of metal in the furnace. Moreover, this opening is initially blocked by the charge of metal, and becomes cleared for use in introducing lime only after a substantial quantity of the charge has been melted to produce a metal bath. Therefore, in such a conventional furnace with a full charge of metal, lime cannot be introduced early in the melting operation, and purification at a slower rate and increased oxidation of the metal bath occurs.

SUMMARY OF THE INVENTION

With this invention, lime is injected into the electric arc furnace through an opening in the top of the furnace. Preferably, the lime is discharged from a nozzle through an inlet port in the top of the furnace at a point distal from the electrodes. The nozzle is constructed, arranged, and oriented to direct a stream of lime essentially toward the center of the surface of the charge of metal without significant impingement of the lime directly on the electrodes. Preferably, the nozzle is constructed and arranged so that when not being used, it can be displaced from the inlet port so that it is not subjected to and destroyed by prolonged exposure to the heat in the furnace.

Objects, features, and advantages of this invention are to provide a method and apparatus for introducing lime into an electric arc furnace which enables lime to be injected any time during the melting operation, provides improved distribution of lime on the surface of the metal bath, improves control of slag formation, and the rate of purification of molten metals, decreases oxidation of molten metals, significantly increases the useful life of electrodes in the furnace, and significantly decreases the maintenance, down time, and cost of operation of the furnace.

BRIEF DESCRIPTION OF THE DRAWINGS

These and other objects, features, and advantages of this invention will be apparent from the following detailed description, appended claims, and accompanying drawings in which:

DETAILED DESCRIPTION OF THE INVENTION

Figure 1:
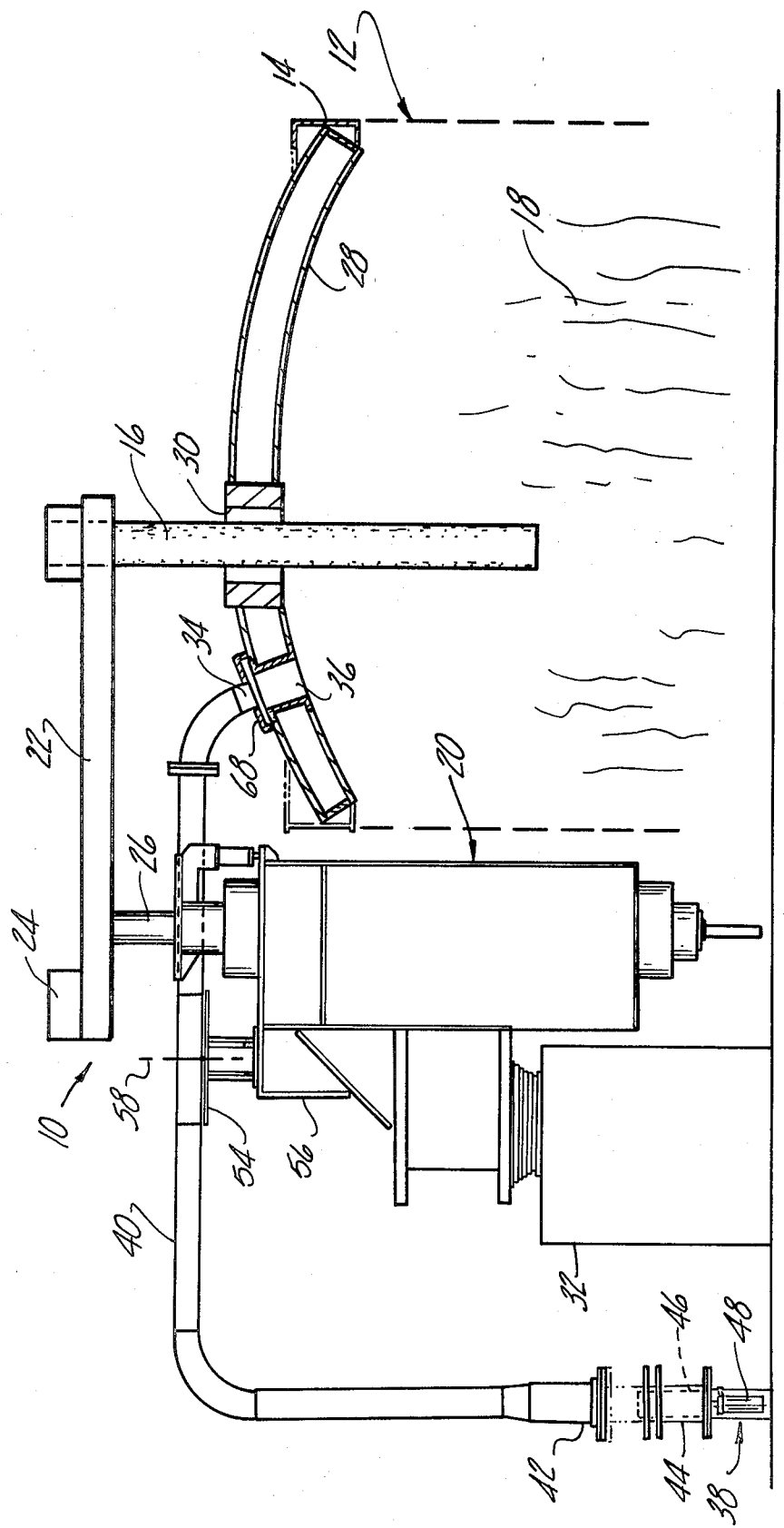
FIG. 1 is of a semi-diagrammatic and fragmentary side view, partially in section, of an electric arc furnace embodying this invention.
Figure 2:
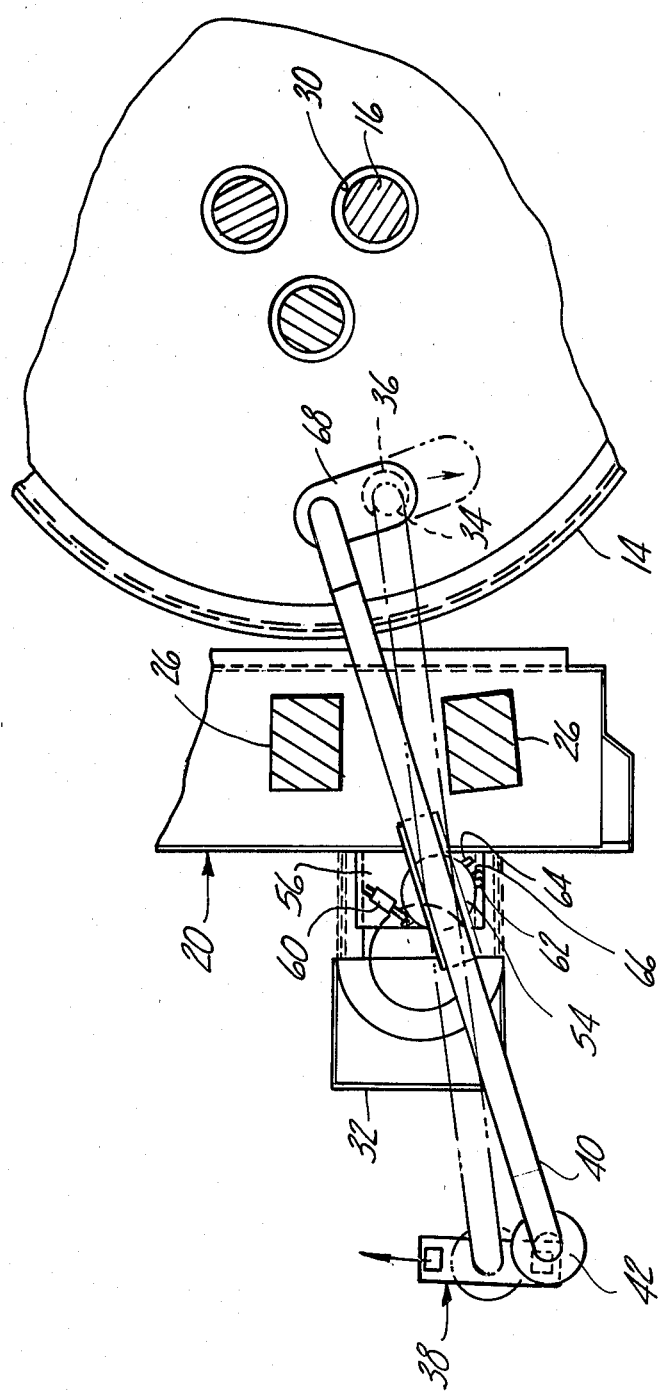
FIG. 2 is a semi-diagrammatic and fragmentary top plan view of the furnace of FIG. 1.
Figure 3:
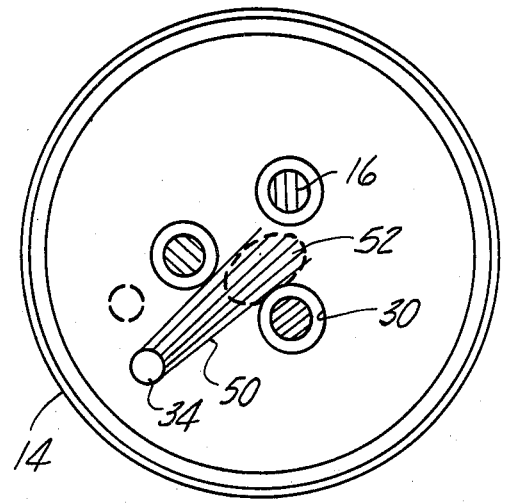
FIG. 3 is a semi-diagrammatic top plan view illustrating introduction of lime into the furnace of FIG. 1.

Referring in more detail to the drawings, FIGS. 1 through 3 illustrate an electric arc furnace 10 embodying this invention and having a pot or shell 12 with a removable top 14 through which three carbon electrodes 16 extend into the interior of the pot. Each of the electrodes 16 is raised and lowered in respect to a charge 18 of metal (FIG. 5) in the pot 12 by a conventional drive mechanism 20 which includes three carrier arms 22, each secured adjacent one end to one of the electrodes 16, having a counterweight 24 secured to the other end and being connected to an actuator rod 26 for raising and lowering the carrier arm and associated electrode.

The shell 12 and its top 14 are lined with a refractory material 28 and each electrode 16 extends through a port 30 in the top which is also lined with a refractory material. The shell 12 and electrode drive mechanism 20 are pivotally mounted on supports 32 (only one of which is shown) so they can be tilted as a unit to pour molten metal from the shell of the furnace through a spout (not shown). The construction, arrangement, and functioning of furnace 10, as thus far described, is conventional.

In accordance with this invention, a nozzle 34 discharges lime into the shell 12 through an inlet port 36. Preferably, the port 36 is laterally spaced from electrode ports 30 and the center of the top 14 so that the nozzle 34 will neither be subjected to any hot gases issuing from the electrode ports 26 nor located in the area of the top 14 which is subjected to the most intense heat from operation of the furnace. A conventional lime propelling apparatus 38 which disperses particulate lime in a stream of forced air under pressure is connected by a conduit or duct 40 to the nozzle 34. An inlet 42 on the lower end of duct 40 is releasably connected and disconnected with apparatus 38 by a movable coupling sleeve 44 telescoped over an outlet tube 46 of the apparatus 38 and raised and lowered by a pneumatic cylinder 48.

Figure 4:
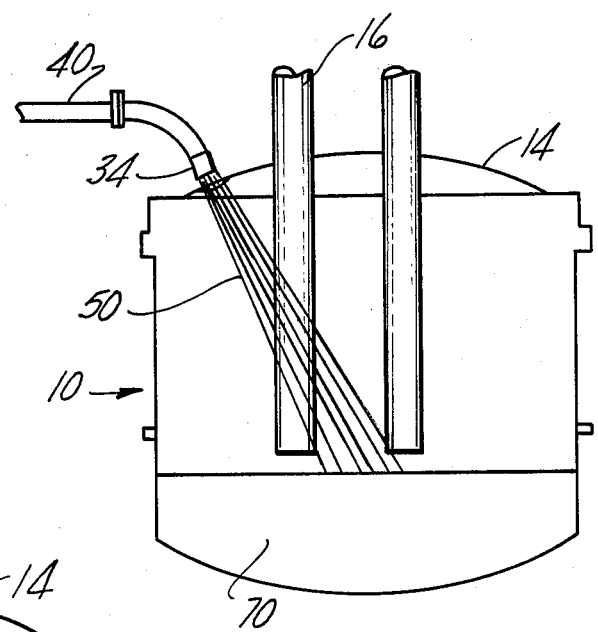
FIG. 4 is a semi-diagrammatic side view illustrating introduction of lime into the furnace of FIG. 1 and onto the upper surface of a bath of molten metal therein.
Figure 5:
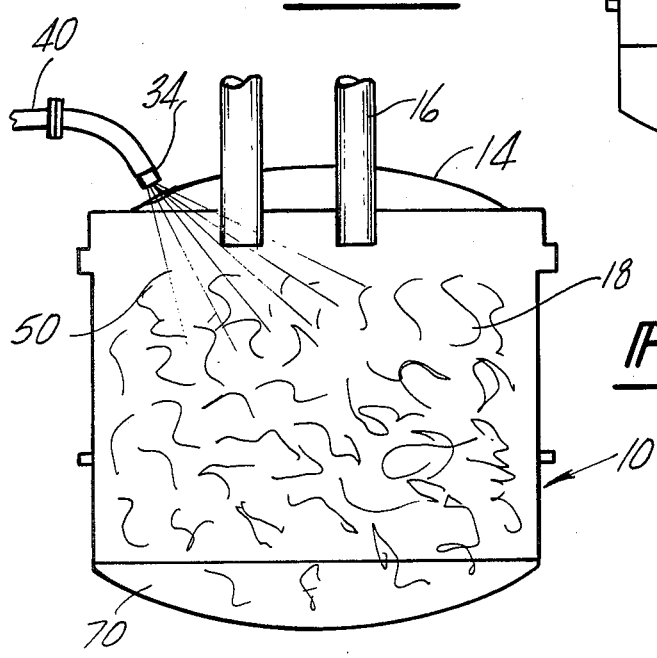
FIG. 5 is a semi-diagrammatic side view illustrating introduction of lime into the furnace of FIG. 1 and onto the upper surface of a full charge of metal, most of which has not been melted.

As shown in FIGS. 2 and 3, the nozzle 34 is constructed, arranged, and positioned to direct a stream of lime 50 so that it does not impinge directly on either the side wall of the shell 12 or the electrodes 16. As shown in FIGS. 3 through 5, preferably, nozzle 34 directs the stream of lime between the electrodes and into an area 52 which is generally in the center or central portion of the upper surface of the charge 18 within the shell 12. So that the inlet port 36 does not engage and deflect the stream of lime discharged from the nozzle 34, the diameter of the inlet port 36 is preferably about 10% to 25% larger in diameter than the nozzle.

In accordance with another feature of this invention, nozzle 34 may be pivotally moved generally laterally to and from registry with inlet port 36 in the top 14 of the charge pot, so that when the nozzle is not in use, it can be moved away from the inlet port and thereby shielded by the top from the heat in the furnace. Duct 40 is carried by a table 54 mounted by a frame 56 fixed to the housing of the electrode drive mechanism for rotation about a generally vertical axis 58. To move the nozzle 34, table 54 is driven by a pneumatic cylinder 60 with its case pivotally mounted on frame 56 and its piston rod pivotally connected to the table. The arcuate movement of the table 54 and, hence, nozzle 34 is limited by engagement of a pair of stops 60 and 62 fixed to the table with an abutment 64 fixed to the frame 56.

For furnaces in which smoke and gases generated in the shell 12 are removed by a partial vacuum created within the shell, a cover 68 is provided to close the inlet port 36 when lime is not being injected into the pot. Preferably, the nozzle 34 extends through and is secured to the cover 64 for lateral movement of the cover with the nozzle to open and close the inlet port 36. Other furnaces do not require any cover 68 because the smoke and gases generated in the shell are simply allowed to flow out through the electrode ports 30 and the inlet port 36 and are then collected by a conventional hood and fan or vacuum system.

In a typical furnace 10, the shell 12 has an inside diameter of about 12 feet, the center line of each electrode is located about 1½ feet from the center line of the shell and its top 14, and the center line of the lime inlet port 36 is located about four feet from the center line of the top. Typically, the nozzle 34 has an outside diameter of about six inches and the inlet port has an inside diameter of about eight inches and is about 12 inches in length.

In using furnace 10, a charge 18 of metal to be melted is placed in the shell 12, and with the cover 14 in place, current is applied to the electrodes 16 to produce an electric arc between the charge and the electrodes which melts the charge of metal. When lime is to be injected into shell 12, nozzle 34 is moved into alignment with port 36 as shown in FIGS. 1 and 2 by energizing cylinder 60 to rate duct 40 to the position shown in phantom line in FIG. 2, wherein the stop 62 bears on the abutment 65. Lime propelling apparatus 38 is coupled to the inlet 42 of the duct 40 by energizing cylinder 48 to raise coupling sleeve 44. Thereafter, apparatus 38 is energized to produce an air stream with particulate lime dispersed therein which flows through the duct 40 and is discharged from nozzle 34 as a stream 50 of lime into the interior of the shell 12. As desired, the lime may be injected into the shell 12 either when the melting of the charge 18 begins as shown in FIG. 5, or any time thereafter, such as when the charge has become a molten bath of metal 70 as shown in FIG. 4.

After injection of the lime is completed, propelling apparatus 38 is turned off and disconnected from the duct 40 by energizing cylinder 48 to retract the coupling sleeve 44. Thereafter, the nozzle 34 may be moved laterally beyond inlet port 36 by energizing cylinder 60 to rotate table 54 and duct 40 to the position shown in solid line in FIG. 2, wherein the stop 64 bears on the abutment 66. In a typical lime injection cycle, the nozzle 34 is in registray with the inlet port 36 for a relatively short period of time and often only for a few seconds. Thus, the nozzle 34 does not become heated sufficiently to be damaged and, hence, the nozzle and duct will last indefinitely. If a cover 68 is used, it may be water cooled and/or refractory lined and, hence, will also last indefinitely.

Since relatively few particles of lime directly impinge on the electrodes 16, it has been found in practice that injecting lime into the pot of a furnace in accordance with this invention does not significantly shorten the useful life of the electrodes and, hence, it decreases the maintenance, down time, and cost of operation of the furnace. Moreover, injection of the lime onto the central portion of the upper surface of the charge and injection of at least part of the lime during the initial portion of the melting operation significantly decreases oxidation of and improves the rate and control of the purification of the molten metal in producing steel.

We claim:

1. A method of injecting particulate material into an electric arc furnace having a shell with a top having a plurality of electrode ports therein through each of which an electrode projects downwardly into the interior of the shell for drawing an arc with a charge of metal to be melted in the shell, the method comprising discharging in a gas stream a plurality of particles of particulate material into the shell through an inlet port in the top at a location laterally displaced from and outwardly of the electrode ports and directing the discharge of the particulate material in the stream generally away from the side wall of the shell, between the electrodes and onto the upper surface of the portion of the charge of metal between the electrodes and adjacent the center line of the shell and such that relatively little of the particulate material impinges directly on any of the electrodes.

2. The method of claim 1 wherein the particles of particulate material are disposed in an air stream and discharged through a nozzle disposed such that it does not project into the interior of the shell.

3. A method of injecting particulate material into an electric arc furnace having a shell with a top having a plurality of electrode ports therein through each of which an electrode projects downwardly into the interior of the shell for drawing an arc with a charge of metal to be melted in the shell, an inlet port in the top, and a nozzle for discharging materials, the method comprising moving the nozzle to a first position wherein the nozzle registers with the inlet port such that any discharge of particulate material from the nozzle in a gas stream passes through the inlet port and into the interior of the shell without the nozzle projecting into the interior of the shell, with such nozzle in such first position discharging a plurality of particles of particulate material into the shell through an inlet port in the top at a location laterally displaced from and outwardly of the electrode ports and directing the discharge of the particulate stream generally toward the center line of the shell and such that relatively little of the particulte material directly impinges on any of the electrodes, and moving such nozzle to a second position displaced from the first position wherein the top of the shell shields the nozzle from heat produced in the shell for melting the charge therein.

4. A method of injecting particulate material into an electric arc furnace having a shell with a top having a plurality of electrode ports therein through each of which an electrode projects downwardly into the interior of the shell for drawing an arc with a charge of metal to be melted in the shell, an inlet port in the top, and a nozzle for discharging materials, the method comprising moving the nozzle to a first position wherein the nozzle registers with the inlet port such that any discharge of particulate material from the nozzle in a gas stream passes through the inlet port and into the interior of the shell without the nozzle projecting into the interior of the shell, with such nozzle in such first position discharging a plurality of particles of particulate material into the shell through an inlet port in the top at a location laterally displaced from and outwardly of the electrode ports and directing the discharge of the particulate stream generally toward the center line of the shell and such that relatively little of the particulate material directly impinges on any of the electrodes, moving such nozzle to a second position displaced from the first position wherein the top of the shell shields the nozzle from heat produced in the shell for melting the charge therein, and a cover movable with the nozzle and constructed and arranged to close the inlet port when the nozzle is in its second position and to permit the nozzle to communicate with the inlet port when the nozzle is in its first position.

5. In an electric arc furnace having a shell with a top having a plurality of electrode ports therein through each of which an electrode projects downwardly into the interior of the shell for drawing an arc with a charge of metal to be melted therein, the improvement comprising an inlet port through said top of said shell at a location laterally displaced from and outwardly of said electrode ports, a nozzle carried by said furnace and constructed and arranged to be disposed in registry with said inlet port, and said nozzle having a cross sectional shape, cross-sectional dimensions, an axial direction and an orientation which are constructed and arranged to direct particulate matter discharged therefrom in a gas stream through said inlet port and generally away from the side wall of the shell, between the electrodes and onto the upper surface of the portion of the charge of metal between the electrodes and adjacent the centerline of the shell, and without any substantial portion of the particulate matter impinging directly on any of the electrodes.

6. The improvement of claim 5 which also comprises a duct having an inlet and an outlet connected to said nozzle, means mounting said duct on said furnace for movement of said nozzle to first and second spaced apart positions, and wherein in said first position said nozzle is in registry with said inlet port so that particulate matter can be discharged from said nozzle through said inlet port and into the interior of said shell and in said second position said nozzle is laterally displaced from said inlet port and shielded by said top from heat produced within said shell.

7. The improvement of claim 6 wherein said duct is pivotally mounted on said furnace and constructed and arranged for pivotal movement of said nozzle to said first and second positions.

8. In an electric arc furnace having a shell with a top having a plurality of electrode ports therein through each of which an electrode projects downwardly into the interior of the shell for drawing an arc with a charge of metal to be melted therein, the improvement comprising an inlet port through said shell at a location laterally displaced from and outwardly of said electrode ports, a nozzle carried by said furnace and constructed and arranged to be disposed in registry with said inlet port, said nozzle being constructed and arranged for movement to a first position wherein said nozzle is in registration with said inlet port for discharging particulate matter in a gas stream into said shell and to a second position spaced from said first position and wherein said top shields said nozzle from heat within said shell, and said nozzle having a cross sectional shape, cross-sectional dimensions, an axial direction and an orientation which are constructed and arranged to direct particulate matter discharged therefrom in a gas stream through said inlet port and generally toward the center of the upper surface of the charge of metal in said shell without any substantial portion of the particulate matter impinging directly on any of the electrodes.

9. The improvement of claim 8 wherein the inside diameter of said inlet port is in the range of about 10% to 25% larger than the inside diameter of said nozzle.

10. In an electric arc furnace having a shell with a top having a plurality of electrode ports therein through each of which an electrode projects downwardly into the interior of the shell for drawing an arc with a charge of metal to be melted therein, the improvement comprising an inlet port through said shell at a location laterally displaced from and outwardly of said electrode ports, a nozzle carried by said furnace and constructed and arranged to be disposed in registry with said inlet port, said nozzle being constructed and arranged for movement to a first position wherein said nozzle is in registration with said inlet port for discharging particulate matter in a gas stream into said shell and to a second position spaced from said first position and wherein said top shields said nozzle from heat within said shell, said nozzle having a cross sectional shape, cross-sectional dimensions, an axial direction and an orientation which are constructed and arranged to direct particulate matter discharged therefrom in a gas stream through said inlet port and generally toward the center of the upper surface of the charge of metal in said shell without any substantial portion of the particulate matter impinging directly on any of the electrodes, and an exterior hood adjacent said inlet port which is constructed and arranged to carry away fumes issuing through said inlet port when said nozzle is in said second position.

11. In an electric arc furnace having a shell with a top having a plurality of electrode ports therein through each of which an electrode projects downwardly into the interior of the shell for drawing an arc with a charge of metal to be melted therein and of the type in which fumes are evacuated from the interior of said shell, the improvement comprising an inlet port through said shell at a location laterally displaced from and outwardly of said electrode ports, a nozzle carried by said furnace and constructed and arranged to be disposed in registry with said inlet port, said nozzle being constructed and arranged for movement to a first position wherein said nozzle is in registration with said inlet port for discharging particulate matter in a gas stream into said shell and to a second position spaced from said first position and wherein said top shields said nozzle from heat within said shell, said nozzle having a cross sectional shape, cross-sectional dimensions, an axial direction and an orientation which are constructed and arranged to direct particulate matter discharged therefrom in a gas stream through said inlet port and generally toward the center of the upper surface of the charge of metal in said shell without any substantial portion of the particulate matter impinging directly on any of the electrodes, and a cover movable to open and closed positions to effectively close said inlet port when said nozzle is in said second position and to open said inlet port when said nozzle is in said first position.

12. The improvement of claim 11 wherein said cover is operatively associated with said nozzle to open and close said inlet port in response to movement of said nozzle to said first and second positions.

13. The improvement of claim 11 wherein said cover is constructed and arranged to be water cooled.

14. The improvement of claim 11 wherein said cover is refractory lined.

* * * * *